United States Patent [19]

Mercier

[11] 4,082,715

[45] Apr. 4, 1978

[54] CRYSTALLIZATION OF POLYCARBONATES

[75] Inventor: Jean-Pierre Mercier, Kessel Lo Belgique, Belgium

[73] Assignee: Unibra S.A., Brussels, Belgium

[21] Appl. No.: 631,608

[22] Filed: Nov. 13, 1975

[30] Foreign Application Priority Data

Nov. 14, 1974  France ............................. 74 37546

[51] Int. Cl.$^2$ ............................................. C08L 67/00
[52] U.S. Cl. ........................ 260/30.6 R; 260/30.8 R; 260/31.2 R; 260/31.6; 260/31.8 B; 260/31.8 M; 260/DIG. 35; 260/47 XA

[58] Field of Search ................... 260/31.8 B, 31.8 M, 260/30.6 R, 30.8 R, 31.2 R, 31.6, DIG. 35; 526/16

[56] References Cited

U.S. PATENT DOCUMENTS

| 3,186,961 | 6/1965 | Sears ................................. 260/30.4 |
| 3,965,064 | 6/1976 | Mercier et al. ................. 260/30.6 R |

*Primary Examiner*—Stanford M. Levin
*Attorney, Agent, or Firm*—Cameron, Kerkam, Sutton, Stowell & Stowell

[57] ABSTRACT

A moulding composition which comprises a polycarbonate polymer, a plasticizer for said polymer, and a finely divided nucleating agent selected from the group consisting of metal salts of polymers carrying lateral carboxylic groups.

10 Claims, No Drawings

CRYSTALLIZATION OF POLYCARBONATES

The present invention relates to the crystallization of polycarbonates. Its object is to provide a method for promoting the crystallization of polymeric materials containing polycarbonates, as well as crystallizable polymeric composition containing polycarbonates, and the invention extends to the at least partially crystalline materials and to the moulded articles obtainable from such a composition.

As is already known, the crystallization of polymeric materials containing polycarbonates can be promoted by incorporating a nucleating agent to the material, prior to crystallization thereof, contingently simultaneously with a plasticizer compatible with polycarbonates. Said nucleating agent is a salt of either carbonic acid or an organic acid. In some cases, appropriately selected nucleating-agents permit to obtain high crystallinity rates in the material as crystallized, without it being necessary to incorporate a plasticizer to that material. In other instances, it proved preferable to incorporate both a nucleating agent and a plasticizer to the material containing polycarbonates. In all the above methods, the polymeric composition, essentially comprising the polycarbonate resin, the nucleating agent and/or the plasticizer, will crystallize when brought to a temperature above the vitreous transition temperature thereof in the course of its use, e.g. during the manufacture of moulded articles.

On the other hand, it has been ascertained that nucleating agents and plasticizers can, at the same time, lower the grade of the polycarbonate resin, which is detrimental to the mechanical properties of the at least partially crystalline products obtained. The present invention obviates such drawbacks, in particular through polycarbonate-containing compositions which, whereas they retain a fair aptitude to crystallization, lead to products having improved properties, in particular, improved impact resistance and thermal stability.

According to a particular feature of the invention, the nucleating agent to be incorporated to the polymeric material containing polycarbonate prior to the crystallization thereof is selected from organic acid salts comprising at least four carboxylic functions per molecule, in particular alkaline salts. A plasticizer compatible with the polycarbonate should preferably be added to said material. The nucleating agent is introduced into the composition mixture as a finely divided solid, having preferably a mean grain size lower than 10 microns, and preferably a mean grain size from 0.1 to 5 microns.

The preferred nucleating agents are the salts of polymers having lateral carboxylic groups. Such polymers, also called "ionomers", are constituted by polymer chains also carrying ionized carboxylic groups to which metal atoms are fixed by ionic bonds. They may comprise, e.g., from 40 to 1000 carboxylic groups per molecule of polymer.

Preferred ionomers are those copolymers generated from an olefinic monomer, such as ethylene or propylene, and an unsaturated acid, such as acrylic or methacrylic acid. Others are the polymers obtained from such an unsaturated acid and the copolymers from such an acid with a styrene monomer. The proportions are preferably from 2 to 80% moles acid with from 20 to 98% moles of said monomer, or preferably from 2 to 10% moles of acid against 90 to 98% moles of an olefinic monomer. The salts of such ionomers most advantageously used in the present invention are lithium, sodium, potassium, calcium and magnesium salts, and more especially sodium or potassium salts.

According to a preferred embodiment, a polymeric composition of the invention contains from 2.5 to 20%, by weight, or preferably, from 2.5 to 10 by weight of plasticizer, and from 0.01 to 20%, or, preferably, from 1 to 10% by weight, of nucleating agent, the balance being a polycarbonate.

The term "polycarbonate" applies, in the present instance and as is conventional, to all the resins constituted by the polyesters which carbonic acid generates with dihydroxy aliphatic-,cyclo- aliphatic-, or aromatic compounds. The most common of them are the bisphenol polycarbonates and they are most suitable for the present invention. By the terms "bisphenol polycarbonates" are meant the carbonic acid polyesters derived from di(hydroxaryl), and more especially, di(hydroxyphenyl), compounds, such as di(hydroxy-aryl)alkanes, di(hydroxyaryl)cycloalkanes, di(hydroxy-aryl)ethers, di(hydroxy-aryl)sulfides, di(hydroxy-aryl)sulfones, di(-hydroxy-aryl)sulfoxides.

The bisphenol polycarbonates derived from di(hydroxy-aryl) alkanes comprise, in particular, the polycarbonates of 4,4'-dihydroxy 2,2-diphenyl methane, ethane, propane or butane, and the homologues thereof further comprising alkyl substituents on the phenyl ring.

Those plasticizers that are compatible with polycarbonates are per se quite conventional. Plasticizers selected from either of the following groups will advantageously be used:

Esters of organic aliphatic acids comprising one or several carboxylic groups, in particular the esters of acetic, propionic, butyric, lauric, adipic, azelic, sebasic acids derived from mono- or polyfunctional alcohols comprising from 1 to 20 carbon atoms.

Esters of aromatic carboxylic acids, such as benzoates, phthalylglycolates, phthalates and the other esters of benzenemono-, di-, or tri-carboxylic acids, derived from alcohols comprising from 1 to 20 carbon atoms, preferred esters belonging to that group being phthalates, trimesates, trimellitate, and more especially those derived from a linear alcohol comprising from 4 to 15 carbon atoms.

Phosphoric acid esters, and more particularly triarylphosphates, derived from alcohols comprising from 2 to 20 carbon atoms.

Sulfonamides, such as N- alkyl (or cycloalkyl) aryl sulfonamides, in particular benzene-sulfonamides and toluenesulfonamides.

Hydrocarbons of the polyphenyl type, and more especially of the chlorinated or brominated polyphenyl type, and more particularly the chlorinated or brominated derivatives of diphenyl, diphenylbenzene and diphenyl-ether.

Preferred plasticizers within the scope of the present invention are dialkyl - or alkyl- aryl phthalates, esters of benzene-tricarboxylic acids derived from linear chain alcohols comprising from 4 to 15, and preferably from 8 to 12 carbon atoms, and, more especially, phthalates, trimesates, and first of all trimellitates. They are especially preferred when used in combination with the above defined nucleating agents.

Other plasticizers particularly preferred for promoting crystallization of polycarbonates while preventing the drawbacks of the polymer being damaged at high temperatures, are those esters generated from an alcohol the molecule of which contains no hydrogen-atom in the β - position with respect to the alcohol group. Said alcohol is, preferably, a polyfunctional alcohol, such as pentaerythrite or trimethylolpropane. The preferred esters of such alcohols are those deriving from an aliphatic acid, preferably a linear chain one, comprising from 4 to 15, and in particular, from 8 to 12 carbon atoms, in the molecule.

In the various embodiments of the invention, the nucleating agent is usually incorporated to the polymeric composition in the form of a finely divided powder, stable at the temperature at which said composition is used and of a grain-size preferably lower than 5 microns, said powder being evenly distributed throughout the composition. The plasticizers as well as the nucleating agents, can be mixed with the polycarbonate by any means within the knowledge of those skilled art. For instance, it is possible to dry-blend the polycarbonate in powder form while adding the plasticizer dropwise, then the nucleating agent in powder form. The plasticizer can itself be introduced in powder form and dry-blended with the polycarbonate and the nucleating agent. Further, it is possible to add the plasticizer and the nucleating agent to molten polycarbonate. It is also possible to dissolve the plasticizer and the polycarbonate in a low boiling-point solvent, e.g. dioxane, then remove the solvent by sublimation in vacuo or dry the mixture prior to incorporating thereto the nucleating agent in the dry state. And all the above embodiments are by no means limitative.

The polymeric composition, constituted by the polycarbonate, the nucleating agent and the plasticizer, quickly crystallizes at temperatures above the vitreous transition temperature thereof, such crystallization occurring usually within a time-period of from about 0.5 minute to 2 hours while the composition is maintained at a temperature of from about 90° C to 225° C.

The composition according to the invention may be formed by any conventional moulding method, in particular moulding under pressure, extrusion, injection. Moulding usually requires heating the composition up to at least 180° C and, in some cases, up to about 300° C. Crystallization occurs when the material is cooling down to room temperature. It can be, however, completed later on by an annealing operation carried out at a temperature promoting cyrstallization, preferably at a temperature from 140° C to 200° C, for a time period from 1 minute to 2 hours.

It is possible to obtain, through the method according to the invention, once the polymeric composition is formed and crystallized, semi-crystalline materials in which are to be found the polycarbonate, the nucleating agent and the plasticizer, in the above preferred proportions, which have a crystallinity degree of from about 5 to 20%, a high impact resistance, usually above 75 kgs × cm per square centimeter in the tensile impact test (ASTM 1822-61 T Standards) and a melting point usually above 220° C. The polymeric compositions have a high thermal stability, as can be shown by measuring the variations of viscosity in the molten state and the decrease of the molecular weight with respect to pure polycarbonate. Such molecular weight variations are usually lower than 30% for the compositions of the invention.

The present invention will be illustrated hereunder by the description of specific examples which are not restrictive. In the examples, the proportions are specified by weight except when otherwise stated.

EXAMPLE I

A bisphenol A polycarbonate, i.e. a polycarbonate of dihydroxy, 4-4' diphenyl 2-2 propane, of the type known under commercial name LEXAN 135 is dry-blended with a plasticizer constituted by tri (n octyl - n decyl) trimellitate, commercially known as MORFLEX 525. The proportion of plasticizer in the mixture is 10% by weight. To that mixture are incorporated 5%, by weight, of a nucleating agent constituted by a sodium salt of an ethylene-acrylic acid copolymer (4,1% mole acid) known as SURLYN 1555.

The mixture is homogenized for two hours in a Lödige-type mixer at 80° C. The speed of rotation is 100 r.p.m.

The thus obtained mixture is dried for 24 hours at the temperature of 120° C, prior to being fed into a short-screw extruder of the Patfoort-type. The rods obtained are then cut before being introduced into a drying overn at 60° C, prior to moulding. The moulding-operation is achieved by pressing at the temperature of 250° C for 5 minutes.

The samples obtained are annealed for one hour at 180° C.

The vitreous transition temperature and the melting point of the products thus annealed, as well as their crystallinity degree, are determined through differential microcalorimetry.

In addition, the molecular weight of the products are determined by viscosimetry using a solution in dioxane at 30° C.

The thus measured features are as follows:
— vitreous transition temperature: 94° C.
— melting point: 227° C.
— crystallinity degree: 7%.
— molecular weight: 40 250

By way of comparison, the molecular weight of Lexan 135 used in this example is 45 600 when pure.

EXAMPLE II

A mixture of bisphenol A polycarbonate and a plasticizer (MORFLEX 525 ) is prepared as mentioned at Example I with a plasticizer content of 10% by weight, and 5%, by weight, of nucleating agent of the SURLYN 1555-type were added thereto.

Homogenization of the mixture was then carried out in a two-roller machine of the C.A.M.I.L.-type, at a temperature of 210° C. The duration of the mixing step is 5 minutes.

The thus obtained extruded samples are moulded into 1 mm-thick plates by pressing, at a temperature of 250° C under a pressure of 18 kgs per square centimeter, for 5 minutes.

The variations of the modulus of elasticity with respect to temperature are observed on a non-annealed sample as such, on the one hand, and on a sample which, in addition, has been submitted to an annealing operation for 15 minutes at 180° C, on the other hand.

The following table provides the results obtained.

| Temperature °C | Modulus of elasticity (in kgs.per sq.cm ) | |
| --- | --- | --- |
| | Non-annealed sample | Annealed sample |
| 50 | 1.7 $10^4$ | 2.0 $10^4$ |
| 100 | 2.0 $10^2$ | 1.5 $10^3$ |
| 140 | 6.0 | 4.5 $10^2$ |
| 160 | 4.5 | 4.0 $10^2$ |
| 180 | 5.0 | 2.5 $10^2$ |

-continued

| Temperature °C | Modulus of elasticity (in kgs.per sq.cm) | |
|---|---|---|
| | Non-annealed sample | Annealed sample |
| 200 | 12.0 | 1.5 $10^2$ |
| 220 | 1.5 | 1.5 |

The annealed sample exhibits a crystallinity degree of 16%.

On other similar samples, non-annealed and annealed for 15 minutes at 180° C, the tensile impact resistance is measured, which leads to the following results.

| | Impact- stress resistance |
|---|---|
| Non-annealed sample | 99 kgs.cm per sq.cm |
| Annealed sample | 65 kgs.cm per sq.cm |

EXAMPLE III

The polycarbonate used is bisphenol A polycarbonate of the LEXAN 135-type or the LEXAN 145-type, these two products only having different molecular weights. The plasticizer is the same as in the above example, viz. MORFLEX 525, or n-octyl and n-decyl trimellitate, used in various proportions in the plasticized polycarbonate. The nucleating agent used is SURLYN 1555, a sodium salt of ethylene-acrylic acid copolymer, in variable amounts.

The mixture is homogenized in a two-roller machine of the C.A.M.I.L. type, at operating temperatures of 190° C, 200° C, 210° C, respectively. The duration of the mixing step is 5 minutes.

The samples are moulded by pressing at temperatures of 225° C or 250° C for 5 minutes. Some samples are subsequently submitted to annealing, at a temperature of 180° C, for 15 minutes.

On the thus obtained samples by using a calendering temperature of 210° C and a press-moulding temperature of 250° C, differential microcalorimetric measurements are carried out in order to determine the melting points and the crystallinity degree. Moreover, tensile impact resistance is determined according to ASTM-standards D 1822-61 T.

The results of such measurments are collected in the following table:

| SAMPLES | No | ANNEALED | | |
|---|---|---|---|---|
| | | Mp (° C) | CD (%) | R Kgcm/cm² |
| LEXAN 135 | | | | |
| +5% Morflex | | | | |
| + 5% Surlyn | (1) | 217 | 20.7 | 89 |
| + 7.5% Surlyn | (2) | 218 | 19.8 | 90 |
| + 10% Morflex | | | | |
| + 1% Surlyn | (4) | 212 | 9.6 | 180 |
| + 2.5% Surlyn | (5) | 225 | 17.5 | 125 |
| + 5% Surlyn | (6) | 222 | 16.0 | 65 |
| LEXAN 145 | | | | |
| + 10% Morflex | | | | |
| + 1% Surlyn | (9) | 222 | 13.6 | 52 |
| + 2.5% Surlyn | (10) | 222 | 12.1 | 47 |

Mp : Melting points.
CD : Crystallinity degrees.
R : Impact stress resistance.

Other samples are prepared in the same way as above described except that tritolylphosphate is used as the plasticizer.

The molecular weights of the above samples are determined through viscosimetry in solution. The plates as obtained after moulding are dissolved in methylene chloride, the solution is centrifuged for 2 hours at a rotating speed of 3,000 r.p.m., then filtered through a glass-cloth. The polymer is precipitated by adding methanol, then dried in a drying oven for 24 hours at 120° C, in vacuo. The molecular weight is determined from intrinsic viscosity, as measured in dioxane at 30° C.

The results obtained with samples prepared from LEXAN 135 containing 10% plasticizer, are as follows:

| Sample No (4), | ( 1 % SURLYN ) : | 34,000 |
|---|---|---|
| Sample No (5), | ( 2.5 % SURLYN): | 30,000 |
| Sample No (6), | ( 5 % SURLYN ) : | 30,000. |

By way of comparison, molecular weights measured with pure LEXAN 135 and pure LEXAN 145 are 45,600, and 30,000, respectively, and if aromatic acid salts are used as the nucleating agent, the polymer molecular weight decreases down to about 20,000.

EXAMPLE IV

Samples are prepared from a mixture of bisphenol A polycarbonate, plasticizer and nucleating agent, according to the same operating steps as in Example III. The nucleating agent is the same as in the preceding examples, but MORFLEX 525 is replaced by each of the following plasticizers.

| Reolube | LP 3600 | (pentaerythritol tetranonoate ) |
|---|---|---|
| Reolube | LP 2800 | (pentaerythritol tetraheptanoate) |
| Reolube | LP 505 | (trimethylol propane ester ) |
| Reolube | LP 501 | (trimethylol propane ester ) |
| Emery | 3137 | ( erythrol ester ) |
| Emery | 3197 | ( erythrol ester ) |
| UNEM | 9960 | ( erythrol ester ) |

EXAMPLE V

A mixture is prepared from bisphenol polycarbonate known under the trade name of Lexan 135, 7.5% by weight of a plasticizer constituted by pentaerythritol tetranonoate and known under the trade name of Reolube LP 3600, and 5% by weight of a nucleating agent constituted by Surlyn 1555 as used in the preceding examples. The mixture is homogenized by mixing for 5 minutes in a two-roller calenderer at a temperature of 210° C or 225° C.

Samples are moulded by pressing at a temperature of 230° C for 5 minutes, then cooled down to room temperature and annealed at 180° C for 15 minutes.

The samples obtained are tested by differential microcalorimetry. A melting temperature of 227° C and a crystallinity degree of 10% are thus measured. The tensile impact resistance measured by the ASTM D 1822 test is 111 kg cm/cm², which may be compared to the value of 20 kg cm/cm² for high impact polystyrene.

Samples are submitted to an impact resistance test according to the IZOD method. They are slotted according to the ISO R 180 standard. The IZOD resistance measured is 59 kg.cm per cm of slot, which may be compared to the value of 11 kg.cm/cm obtained with high impact polystyrene. Furthermore, the samples show no brittleness when submitted to the prestress resistance test according to ASTM D 638 (type I) standard.

EXAMPLE VI

Results similar to those of the preceding examples are obtained when using, instead of bisphenol A polycarbonate with formula:

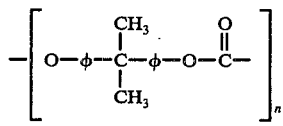

($\phi$ is the benzene ring and $n$ is an integer) polycarbonate F with formula:

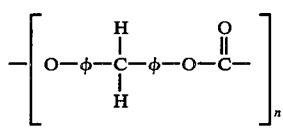

or polycarbonate S with formula:

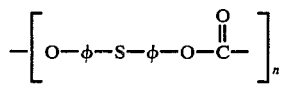

is used.

The crystallization temperature are of the same order of magnitude as those already specified.

EXAMPLE VII

By proceeding substantially as described in the above examples while varying the type of ionomer salt used as the nucleating agent, the following results are obtained for composition mixtures containing Lexan 145 and 7.5% Reolube 3600 and 1% nucleating agent (by weight), moulded by pressing at 220° C for 5 minutes and annealed by heating at 180° C for 15 minutes.

| NUCLEATING AGENT | | CRYSTALLINITY DEGREE % | TENSILE IMPACT RESISTANCE kgcm/cm$^2$ | MODULUS OF ELASTICITY AT 160° C dynes/cm |
|---|---|---|---|---|
| Sodium polyacrylate | | 10.2 | 46 | 4.10$^8$ |
| Copolymer | 48% polystyrene 52% sodium polyacrylate | 10.5 | 49 | 4.7 10$^8$ |
| Copolymer | 50% polystyrene 50% sodium polyacrylate | 10.8 | 39 | 5.2 10$^8$ |

Similar results are obtained when potassium polymethacrylate is used instead of sodium polyacrylate.

What we claim is:

1. A moulding composition comprising a polycarbonate polymer from 2.5 to 20% by weight of a plasticizer for said polycarbonate, and from 0.01 to 20% by weight of a finely divided nucleating agent selected from the group consisting of metal salts of polymers carrying lateral carboxylic groups.

2. A composition according to claim 1 wherein said nucleating agent is a copolymer of an olefinic monomer and an unsaturated acid.

3. A composition according to claim 2 wherein said olefinic monomer is ethylene or propylene.

4. A composition according to claim 1 wherein said nucleating agent is a copolymer of styrene and an unsaturated acid.

5. A composition according to claim 1 wherein said nucleating agent is an alkali metal salt.

6. A composition according to claim 1 wherein said plasticizer is an ester selected from the group consisting of the esters of benzene mono-, di-, or tri-carboxylic acids and esters of polyhydroxy alcohols.

7. A composition according to claim 6 wherein said plasticizer is selected from the group consisting of the esters of alcohols without a hydrogen atom in the $\beta$ position with respect to a hydroxy group.

8. A composition according to claim 1 comprising from 1 to 10% by weight of said nucleating agent.

9. A composition according to claim 1 wherein the mean grain size of said nucleating agent is lower than 10 microns.

10. A polymer material comprising a mixture of a polycarbonate polymer, from 2.5 to 20% by weight of a plasticizer for said polymer, and from 0.01 to 20% by weight of a finely divided nucleating agent selected from the group consisting of metal salts of polymers carrying lateral carboxylic groups, said mixture being in at least partly crystalline form.

* * * * *